June 8, 1943.   A. F. ANDERSON   2,321,059
ANTISLIPPING DEVICE FOR LOCOMOTIVES
Filed Jan. 6, 1941   6 Sheets-Sheet 1

INVENTOR.
A. F. ANDERSON
BY Martin E. Anderson
ATTORNEY.

June 8, 1943.  A. F. ANDERSON  2,321,059

ANTISLIPPING DEVICE FOR LOCOMOTIVES

Filed Jan. 6, 1941 6 Sheets-Sheet 2

INVENTOR.
A.F. ANDERSON
BY Martin E. Anderson
ATTORNEY.

June 8, 1943.   A. F. ANDERSON   2,321,059
ANTISLIPPING DEVICE FOR LOCOMOTIVES
Filed Jan. 6, 1941   6 Sheets-Sheet 3

INVENTOR.
A. F. ANDERSON
BY Martin E. Anderson
ATTORNEY.

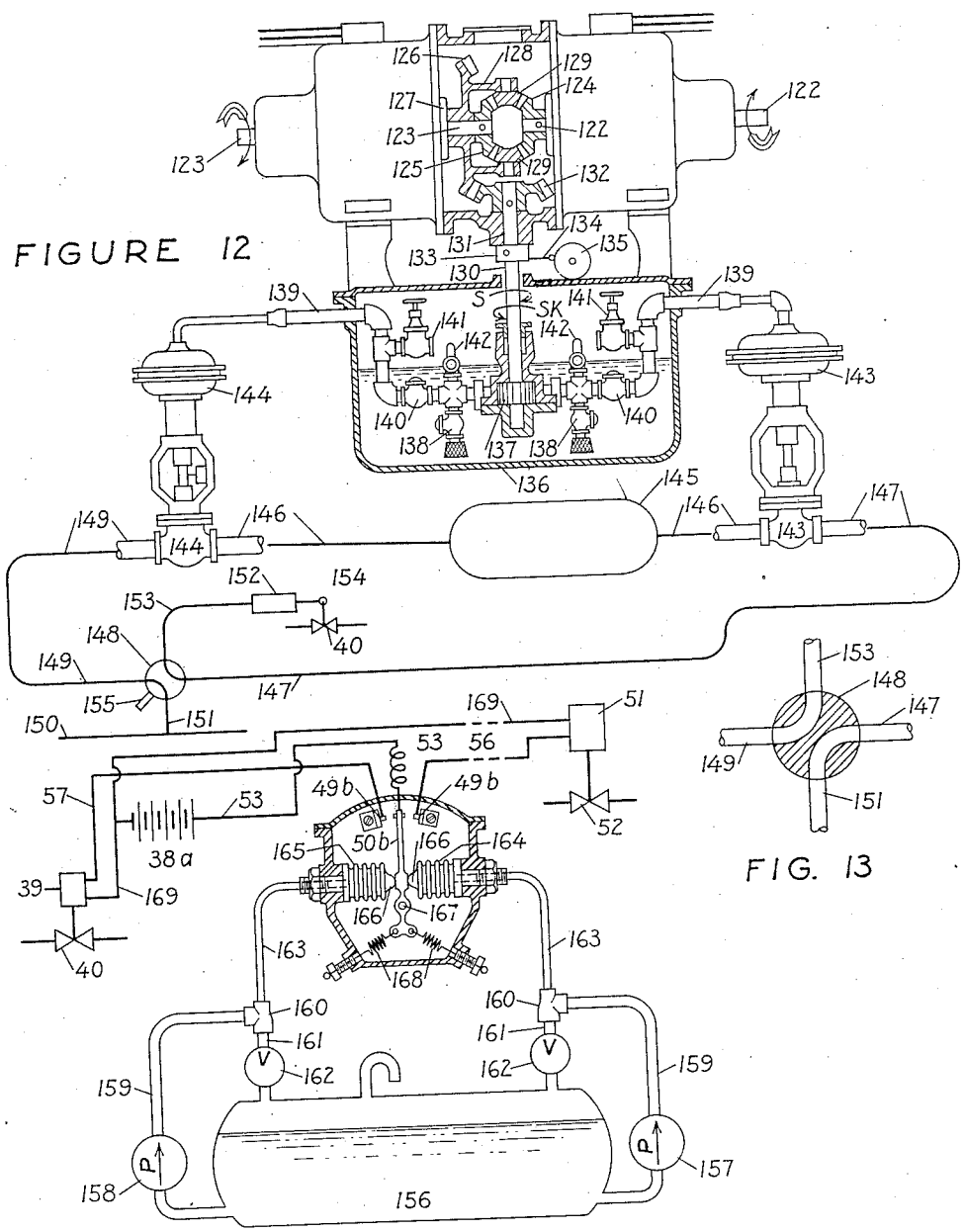

June 8, 1943.   A. F. ANDERSON   2,321,059
ANTISLIPPING DEVICE FOR LOCOMOTIVES
Filed Jan. 6, 1941    6 Sheets-Sheet 6

INVENTOR.
A. F. ANDERSON
BY Martin E. Anderson
ATTORNEY.

Patented June 8, 1943

2,321,059

UNITED STATES PATENT OFFICE 2,321,059

ANTISLIPPING DEVICE FOR LOCOMOTIVES

Albert F. Anderson, San Francisco, Calif.

Application January 6, 1941, Serial No. 373,225

3 Claims. (Cl. 192—3)

This invention relates to improvements in locomotives and railway trains; having reference particularly to the providing of means for preventing excessive skidding or slipping of the wheels on the rails due to improper or faulty application of the brakes or of the power, or from other causes, such as from slippery rails.

It is one object of this invention to provide means which will automatically reduce the amount of power applied to the drive wheels of a locomotive when the slippage exceeds a predetermined amount.

Another object is to provide means for reducing the braking action on the wheels whenever the slippage or skidding due to the braking action becomes excessive.

In order to more clearly describe the invention, reference will now be made to the accompanying drawings, in which the invention has been illustrated, and in which:

Figure 12 is a view partly in elevation and partly in section showing a modified form of the invention in which the differential speedometer has been replaced by a differential gear mechanism and in which hydraulic means is employed instead of electrical means for the purpose of controlling the operation of certain valves;

Figure 13 is a view representing a four-way valve employed in the hydraulic embodiment;

Figure 14 shows another modification operating on the hydraulic principle and in which the electric circuits are controlled by the differential action of two pressure devices.

Figure 1:
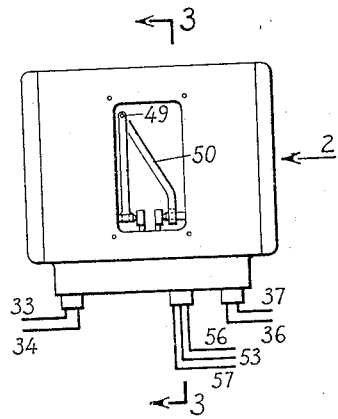
Figure 1 is a side elevation of a differential speedometer employed in one embodiment of this invention.
Figure 2:
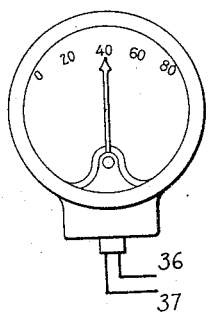
Figure 2 is an end elevation looking in the direction of arrow 2, in Figure 1.

Referring now to the drawings, reference numeral 20 designates the rails of a railway track, one of which is shown supporting a locomotive, indicated as a whole by reference numeral 21. The drive wheels have been designated by reference numerals 22, and in the embodiment shown there are three interconnected pairs of drive wheels. The number of drive wheels is, of course, immaterial. Reference numeral 23 designates a freely rotatable pilot wheel of which two pairs are usually employed. In the embodiment shown only one pair of pilot wheels have been illustrated. It is to be understood that by the term pilot wheels applicant does not intend to limit himself in any way to the freely rotatable wheels secured to a pilot truck, but intends to include the wheels of the tender or any other unbraked wheels connected with the locomotive or the train which always rotate at a peripheral speed equal to the speed of the train along the rails. For reasons which will appear as the description proceeds, the position of the pilot wheels with respect to the engine or train is also immaterial, provided they are never subjected to forces which cause them to slip to any appreciable extent.

Figure 7:
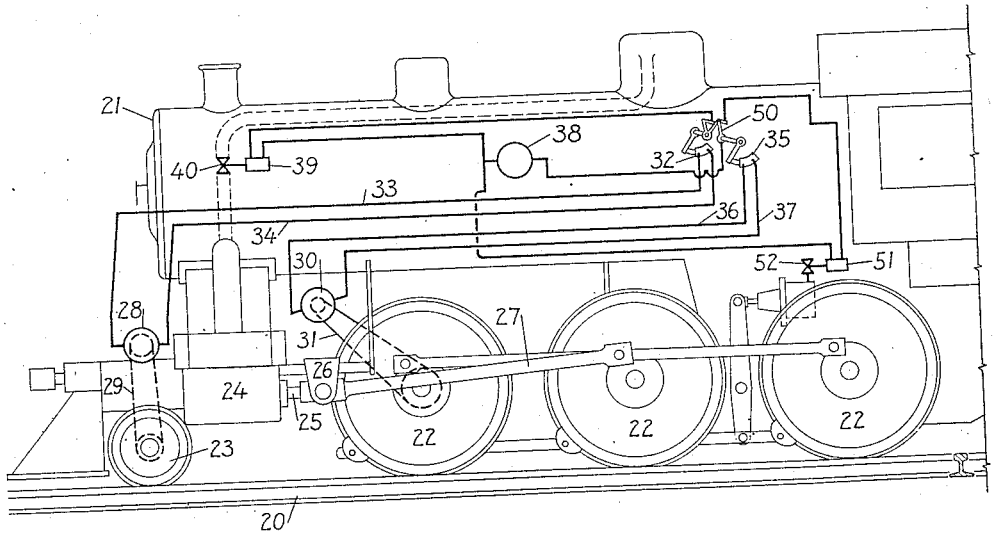
Figure 7 is a view showing the outlines of a locomotive and showing the several elements of the mechanism in place thereon.

The engine is provided with the usual cylinders 24, piston rods 25, crossheads 26, and connecting rods 27. In Figure 7, reference numeral 28 designates a direct current generator that is driven from the axle of the pilot wheels by means of a belt 29 and reference numeral 30 designates another direct current generator which is driven from a drive wheel axle by means of a belt 31. The speeds at which the different generators are driven when the locomotive rolls along the track without any of the wheels slipping, and the designs of the generators are such that while the drive wheels and the pilot wheels rotate at the same peripheral speed, the voltage generated will be equal regardless of the speed at which the locomotive travels. Generator 28 is connected with a solenoid 32 by means of conductors 33 and 34. Generator 30 is connected with the solenoid 35 by means of conductors 36 and 37. Reference numeral 38 designates a direct current generator which is driven by any suitable means and which provides current for the operation of an electromagnetic device 39 that serves to close the throttle valve 40 when the peripheral speed of the drive wheels exceeds the peripheral speed of the pilot wheel by a predetermined amount.

Figure 8:
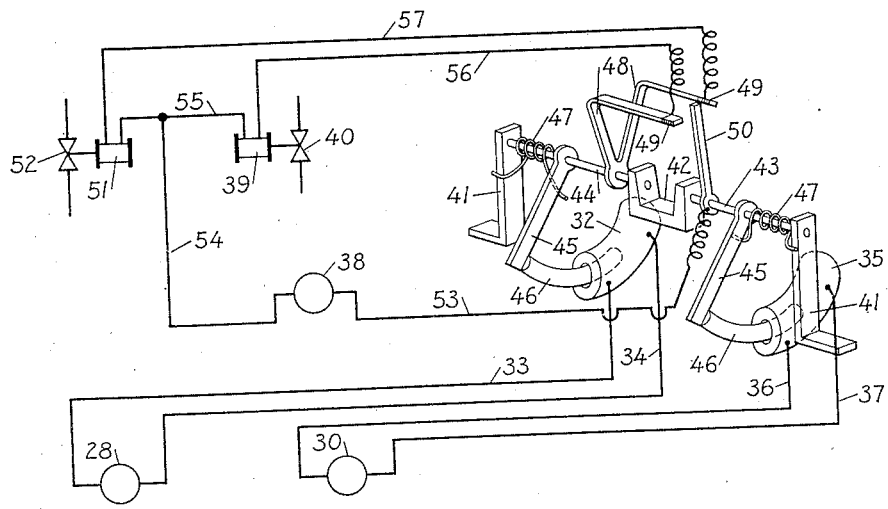
Figure 8 is a wiring diagram and a diagrammatic illustration of the differential speedometer employed in one embodiment of the invention.

Referring now more particularly to Figure 8 reference numerals 41 represent two spaced bearing brackets which cooperate with the bearing block 42 to form spaced bearings for shafts 43 and 44. Each shaft is provided with an arm 45 to the end of which is secured an arcuate core 46 of soft iron. A spring 47 is associated with each arm 45 and tends to move it in a clockwise direction when viewed as in this figure. Shaft 44 is provided with a pointer comprising two angularly spaced arms 48 whose ends are bent at right angles and terminate in electrical contacts 49 which are insulated from the arms 48. Shaft 43 is provided with a single pointer 50 which is positioned between the contacts 49 and which can be moved into electrical contact with either of them in response to peripheral speed variations in the drive and pilot wheels. Reference numeral 51 designates an electromagnetic device for opening a valve 52 which controls the air brake operation. One terminal of generator 38 is connected with pointer 50 by means of conductor 53. The other terminal of generator 38 is connected by means of a conductor 54 with another conductor 55 which connects to the two coils of the electromagnetic devices 39 and 51. A conductor 56 connects the free end of the coil on device 39 with one electrical contact 49 and another conductor 57 connects the free end of the coil on device 51 with the other contact 49. It will now be evident that if pointer 50 moves toward the right and comes into contact with electrical contact 49 positioned to its right, current from the generator 38 will flow through the coil on the electromagnetic device 51 and operate the air control valve 52. If pointer 50 moves relative to the contacts 49 so as to come into engagement with the contact situated to the left of pointer 50 electromagnetic device 39 will operate and close the valve 40.

Since the generator 30 is driven from the axle of the drive wheels, it is obvious that when the drive wheels slip on the rail, due to an excessive amount of power, pointer 50 will move in a counterclockwise direction until it engages contact 49 at its left, thereby closing the valve 40, checking the flow of steam and thus reducing the power; whereas if the drive wheels skid, due to an excessive braking force applied to them, pointer 50 will move into engagement with the contact 49 to the right, whereupon, the electromagnetic device 51 will operate valve 52 and reduce the braking force.

Figure 9:
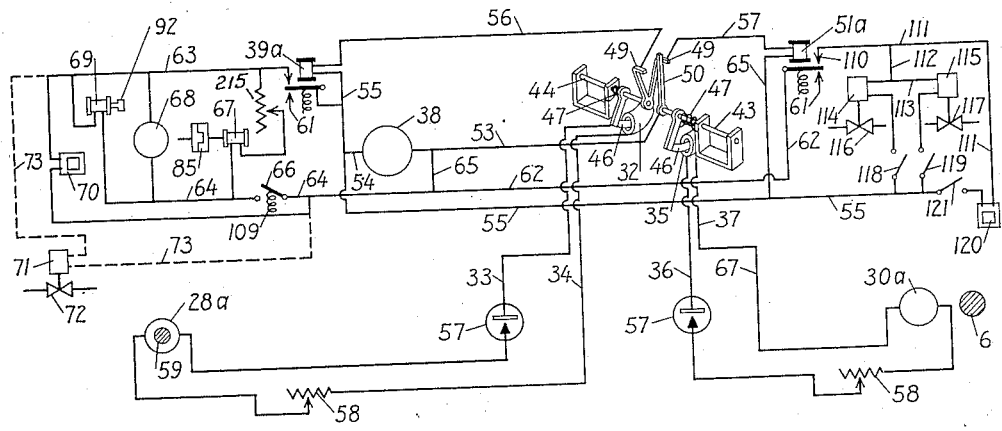
Figure 9 is a wiring diagram showing the relationship and the interconnection of the various elements; comprising the invention.

In Figure 9 a somewhat more elaborate schematic representation of the invention is shown. In this embodiment the direct current generator 28 has been replaced by an alternating current generator 28a and the direct current generator 30 by an alternating current generator 30a. Interposed between generator 28a and the solenoid 32 is a half wave rectifier 57 and a rheostat 58 which is connected in series with the generator and the solenoid. The circuit from generator 30a is likewise provided with a one-half wave rectifier 57 and a rheostat 58. Due to the different speeds of rotation of the pilot and the drive wheel axles, the former, which has been designated by reference numeral 59, is directly connected with the generator 28a, while the latter, which has been designated by reference numeral 60 drives generator 30a by means of a belt or any other suitable transmission device so as to obtain equal voltages from the two generators when the peripheral speeds of the pilot wheels and the drivers are equal.

In the embodiment illustrated in Figure 9, where the various mechanisms have been elaborated on, the electromagnetic device 51 shown in Figure 8, is here shown as a relay 51a having an armature 61 that is connected to the generator 38 by means of a conductor 62 and in a like manner the electromagnetic device 39 of Figure 8 is here shown as a relay 39a, like that designated by numeral 51a, and which has its armature 61 connected with the generator 38 by means of the conductors 54 and 55. Whenever the drive wheels slip, due to the application of too much power, the voltage of generator 30a will rise, thereby increasing the pull of the solenoid 35 on its core 46 and move the pointer 50 into engagement with the contact 49 to the left, whereupon relay 39a will close and connect conductor 63 to 55. Conductor 64 is connected to conductor 53 by conductor 65 and we now have a condition in which conductors 63 and 64 are connected in series with the generator 38. A normally closed limit switch 66 is connected in series with conductor 64 for a purpose which will hereinafter appear.

Let us now assume that limit switch 66 is closed and that armature 61 engages the terminal connected with conductor 63. Under these conditions, current from the generator 38 will flow through the electromagnet 67, through the motor 68; through the electromagnet 69 and through the bell or buzzer 70, the circuits of all being connected in parallel. Where the invention is applied to a compound locomotive current will also flow through the coil 71 of an electromagnetically operated valve 72 for the purpose of by-passing steam around the low pressure cylinders when the high pressure cylinders charge the connecting pipes with too much steam due to the slipping drivers. The circuit to the coil 71 has been shown by broken lines 73.

Figure 10:
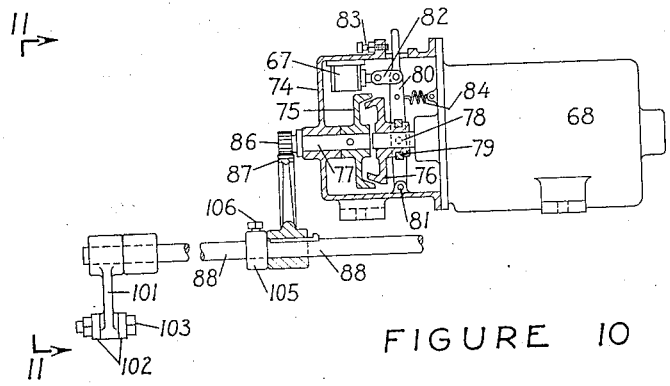
Figure 10 is a view somewhat similar to the view shown in Figure 6 and shows a portion of the motor in section for the purpose of disclosing the position and construction of the magnetic clutch.

Referring now to Figure 10, it will be seen that the electromagnet 67 is secured to the inner surface of housing 74 within which is positioned a friction clutch comprising two members 75 and 76. Clutch member 75 is keyed to the shaft 77 and clutch member 76 is nonrotatably and slidably keyed to the motor shaft 78. The hub of clutch member 76 is provided with a groove in which is positioned a ring 79 that is pivotally connected to the lever 80 which, in turn, is pivoted at its lower end at the point indicated by reference numeral 81. The armature or core of electromagnet 67 is connected with lever 80 by means of links 82 and an adjustable stop 83 serves to limit the movement of lever 80 in response to the electromagnet 67. In the position shown in Figure 10, the friction clutch is in disengaged position so that no power can be transmitted by it from shaft 78 to shaft 77. A spring 84 serves as a means for normally keeping the friction clutch member 76 in this position.

Figure 6:
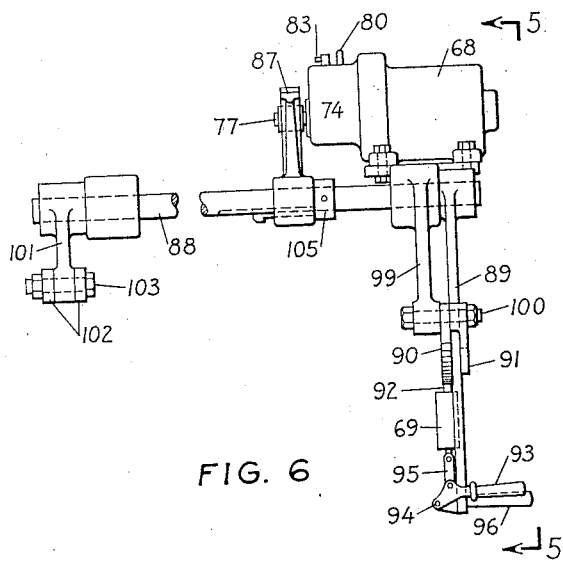
Figure 6 is a side elevation of the mechanism shown in Figure 5, looking in the direction of arrow 6, in Figure 5.
Figure 5:
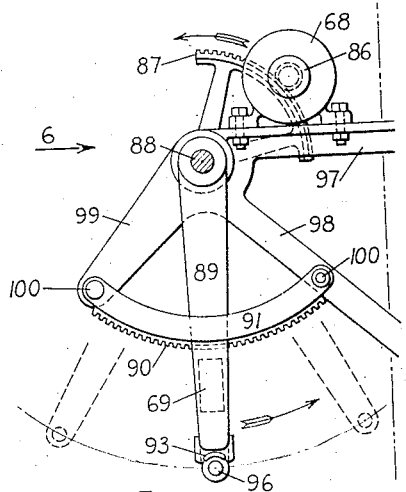
Figure 5 is a view taken on line 5—5, Figure 6 and shows the locomotive throttle lever to which has been added an electrical motor and a magnetic release for automatically closing the throttle under certain predetermined conditions.
Figure 11:
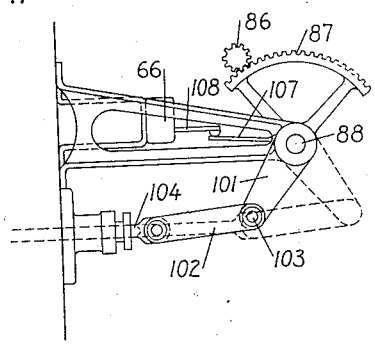
Figure 11 is a side elevation looking in the direction of arrows 11—11, Figure 10.

A reference to Figure 9 will show that whenever relay 39a is closed the motor 68 will rotate and simultaneously with it the clutch, which has been designated by reference character 85 in Figure 9, will be closed by the operation of the electromagnet 67, thereby connecting the motor to the shaft 77 causing the latter to rotate. The outer end of shaft 77 is provided with a pinion 86 which is in mesh with a segmental spur gear 87 that is keyed to shaft 88. Nonrotatably secured to shaft 88 is a throttle lever 89 that extends between the toothed quadrant 90 and the arcuate guide member 91. (Figures 5 and 6). The throttle lever is provided with a pawl 92 that can be reciprocated by means of a handle 93 which is pivotally connected at 94 with the outer end thereof. A link 95 transmits force from the lever 93 to the pawl 92 which is urged into engaged position by a spring that has not been shown because it is of a usual construction. A handle 96 is rigidly connected with the outer end of the throttle lever. The quadrant 90 and the guide member 91 are secured to a bracket having arms 97, 98 and 99 by means of bolts 100. Secured to one end of shaft 88 is a crank arm 101, to the outer end of which links 102 are pivotally attached by means of a bolt 103. The free ends of links 102 are pivotally connected with a slidable rod 104 which operates the throttle valve that controls the amount of steam delivered to the engine cylinders. A collar 105 is nonrotatably secured to shaft 88 by means of a set screw 106 or by any other suitable means. Attached to this collar is an arm 107 which engages and moves switch arm 108 into open position when the throttle valve mechanism is moved into closed position. Switch arm 108 controls the operation of limit switch 66 which is positioned in the housing shown in Figure 11. This switch or circuit closer is biased to closed position by means of a spring 109 which has been indicated in Figure 9.

Referring again to Figure 9, it will be seen that when the limit switch 66 is moved to open position, motor 68 will stop rotating and the electromagnet 67 will release lever 80 and permit the clutch members 75 and 76 to separate and at the same time current will be cut off from electromagnet 69 and signal 70, but not from the electromagnetic valve 71, 72.

At this point attention will be called to the function of the electromagnet 69 which has been diagrammatically indicated in Figure 9 and which has also been shown as positioned on the throttle lever 89. (See Figure 6.) It has been explained above that the pawl 92 is urged into engaged position by a spring and before motor 68 can turn shaft 88, it is necessary to disengage the pawl from the quadrant and for this purpose an electromagnet device represented by numeral 69 is provided which moves the pawl to disengaged or inoperative position, a portion of the pawl serving as an armature, for the electromagnet, and since 69 and 68, as well as 67, are connected in parallel between wires 63 and 74, the throttle lever will be released from the quadrant whenever current is supplied to the motor 68, whereupon the motor can furnish to turn the shaft 88 and close the throttle valve. The electromagnet 69 does not in any way interfere with the normal operation of the throttle lever and is effective only when the automatic throttle closing mechanism functions.

Let us now assume that a train is being started under conditions which allow the drive wheels to slip more than the predetermined amount relative to the movement of the train. The increased rotation of the drive shaft 60 increases the voltage of the generator 30a, and moves the pointer 50 towards the left with respect to the contacts 49 and when the speed differential has attained its predetermined value, electrical connection is effected between pointer 50 and the contact 49 which is located to the left, this causes the relay 39a to operate, whereupon the throttle valve is closed by the means above described and illustrated in Figures 5, 6, 10, and 11. When the power is thus cut off, the slipping will stop and the pointer 50 will break contact and returns to its mid-position between contacts 49. After this mechanism has functioned the operator can reopen the throttle in the usual manner by means of lever 89.

Referring again to Figure 9, it will be observed that the contact of relay 51a is connected by means of conductors 111, 112, and 113 with solenoids 114 and 115 which control air valves 116 and 117 respectively. Manually operable switches, 118 and 119, permit the operator to connect either one or both of the solenoids 114 and 115 with conductor 55. Conductor 111 extends to a buzzer 120 which can be connected to or disconnected from conductor 55 by means of a switch 121.

Let us now assume that the brakes are applied to the drive wheels either in stopping the train or in going down a steep grade and that for some reason the brakes are applied so forcefully that the drive wheels rotate insufficiently and begin to slip on the rails; the decrease in the speed of rotation of axle 60 will correspondingly reduce the voltage of generator 30a, thereby reducing the pull on the core 46 effected by solenoid 35, thus allowing spring 47 to function and move pointer 50 into engagement with contact 49 positioned to the right, thereby closing the circuit from generator 38 to the relay 51a. Relay 51a then functions, connecting conductor 111 with the opposite side of generator 38 from that to which conductor 55 is connected, whereupon current from this generator will flow through either or both of the solenoids 114 and 115, depending upon which of the switches 118 and 119 is closed. If switch 121 is closed, the buzzer 120 will operate, advising the engineer that the brakes are being released through the action of the automatic mechanism above described. The solenoid 114 controls valve 116, causing the brakes on the "Automatic air brake system" to slacken while valve 117 which is controlled by solenoid 115 causes the brakes on the "Straight air brake system" to relinquish their effect accordingly.

Figure 3:
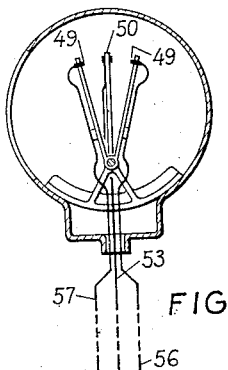
Figure 3 is a section taken on line 3—3, Figure 1, and shows the relationship of the pointers.
Figure 4:
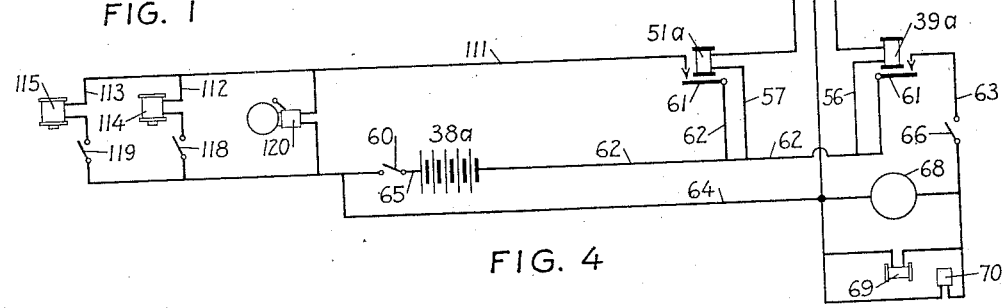
Figure 4 is a simplified wiring diagram showing the essential electrical connections.

In Figure 4 a somewhat simplified circuit diagram has been shown in which the conductors and parts that are common with Figure 9 have been indicated by the same reference characters. In this view, instead of the generator 38, a battery 38a has been shown. One pole of this battery is connected by means of a wire 62 with the conductors 56 and 57 in which the relay coils 39a and 51a are connected in series. When the drive wheels slip, due to an excessive amount of power applied, pointer 50 will move into engagement with contact 49 to the right in Figure 3, thereby connecting conductors 56 and 53, which completes a circuit from the battery 38a through conductor 64, switch 60, and conductor 65. Relay 39a is thus energized, and armature 61 is attracted, connecting conductor 62 with conductor 63, applying current from the battery 38a to the motor 68, electromagnet 69, and buzzer 70, which are connected in parallel between conductors 63 and 64, while limit switch 66 remains closed. The parts operated by motor 68 will then function to close the throttle valve which regulates the power applied to the drive wheels. If, instead of the drive wheels slipping, we assume that the brakes are applied so hard in stopping or going down hill that the drive wheels begin to slide or skid on the rails, the pointer 50 will now engage contact 49 to the left in Figure 4, thereby energizing the relay 51a which in turn connects conductor 111 with conductor 62, to complete a circuit which will sound the signal 120 and if either or both of switches 118 and 119 are closed, the corresponding electromagnets 114 and 115 will be energized, thereby opening one or both valves 116 and 117, which are shown in Figure 9, thus reducing the braking action continuously until the wheels are able to rotate sufficiently.

Attention is called to the fact that in the apparatus described generators 28, 28a and 30, 30a generate voltages that are proportional to the speed of the train along the track and to the peripheral speed of wheels 22 and that the currents flowing in solenoids 32 and 35 produce a corresponding attractive force on the cores 46, which forces are resisted by the springs 47. The displacements of pointer 50 and contacts 49 are therefore proportional to these forces and since these vary in accordance with the peripheral speed of the wheels 22 and the speed of the car or train along the track, it is evident that pointer 50 and contacts 49 can serve as speed indicators as well as slip or skid indicators. The alternative devices shown in Figures 12, 14, 15 and 16 also depend for their operation on the differential action of opposed forces.

In the above descriptions electrically operated means for effecting the desired operations have been described. It is possible and it may at times be preferable to employ hydraulic means in combination with electrical means or hydraulic means in combination with mechanical means for effecting the desired operations.

Figure 17:
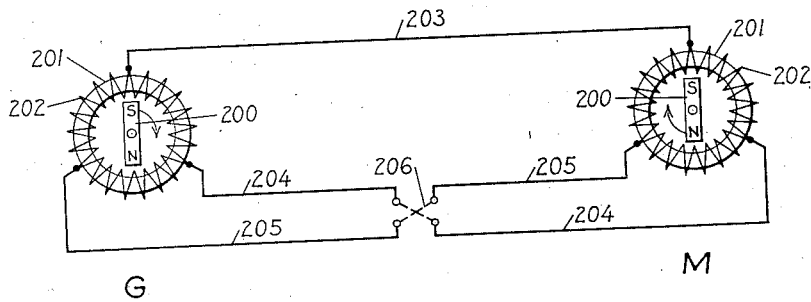
Figure 17 is a wiring diagram showing one form of synchronous electrical transmission.

In Figure 12 a mechanism has been shown in which a differential gear is employed for operating a pump when the peripheral speed of the drive wheels and the pilot wheels begin to vary. In this mechanism there are two shafts 122 and 123 which are rotated respectively at speeds proportional to the peripheral speeds of the drive wheels and of the pilot wheels. These shafts might be driven directly from the axles of the drive and the pilot wheels by means of belts or other suitable transmission devices, but in the embodiment illustrated each shaft is provided with an electrical transmission device comprising a "Selsyn" motor connected with a three-phase generator driven by the respective axles of the drive and pilot wheels. The generators are of the type in which there is a magnet rotatable within a Gramme ring armature and the motors are of the same construction and have the magnets attached to the shafts 122 and 123. This type of synchronous electrical power transmission is well known and therefore need not be illustrated in detail, but is indicated in Figure 17.

Non-rotatably secured to shaft 22 is a bevel gear 124 and a similar gear 125 is non-rotatably attached to shaft 123. A ring gear 126 is pivoted for free rotation on shaft 123 and is positioned between the hub of gear 125 and bearing 127. Gear 126 has two or more arms 128 that carry differential pinions 129. A shaft 130 is rotatably mounted in the bearing 131 and has non-rotatably secured thereto a pinion 132 which meshes with the ring gear 126. In accordance with the well known operation of differential gears, the ring gear 126 will remain stationary whenever the shafts 122 and 123 rotate in opposite directions at equal speeds. If, however, one of the shafts changes its speed relative to the other so as to rotate either faster or slower, the ring gear will accordingly rotate one way or the other on axle 123 and produce a corresponding rotation of shaft 130. A collar 133 is attached to the shaft 130 and carries a resilient arm 134 having an enlarged head which strikes the gong 135 once each revolution of the shaft, thereby giving an audible signal to advise the engineer or operator that the differential mechanism is operating due to wheel slippage.

Shaft 130 extends into a reservoir 136 which is partly filled with oil or other liquid. A gear pump 137 is connected with the lower end of shaft 130. It is understood that the intake and outlet ports of gear pumps shift in accordance with their direction of rotation and in the present instance, since the pump can rotate either way, no distinction can be made as to which is the intake and which is the outlet port and they will therefore be referred to as ports. Both of the ports of the pump are connected with the interior of the reservoir through a check valve 138 which permits liquid to flow upwardly into the pump but prevents it from flowing in the opposite direction. Both ports are piped to pressure-operated diaphragm valves by pipes which have been designated by reference numeral 139. These pipes may be made up of various sections and couplings as shown and each contains a check valve 140 which permits liquid to flow outwardly or away from the pump, but prevents it from flowing towards the pump. Connecting the pipes 139 with the interior of the reservoir are valves 141 which are maintained in partly open position so as to permit the circulation of the fluid during the operation of the pump because the fluid cannot flow outwardly through the pipes beyond the diaphragm. Both sides of the pump are provided with relief valves 142 which permits the liquid to flow into the reservoir if the pressure builds up beyond a predetermined limit. Pipes 139 terminate in pressure operated diaphragm valves which have been designated by reference numerals 143 and 144. These valves are of the type that are held in closed position by means of a spring and are opened when pressure of the required intensity is applied to the diaphragm. In Figure 12, a reservoir containing air under pressure has been shown and designated by reference numeral 145 and this is connected with both of the valves 143 and 144 by means of pipes 146. At the opposite end of valve 143, a pipe 147 extends to a four-way valve 148 and in a similar manner a pipe 149 extends from valve 144 to the four-way valve. The four-way valve has been shown in its other position to a somewhat larger scale in Figure 13. The train line of the "Automatic air brake system" has been designated by reference numeral 150 and this is connected to the four-way valve by the pipe 151. A cylinder 152 is connected with a four-way valve by means of a pipe 153. The cylinder 152 contains a piston that is joined with a piston rod 154 which controls the throttle valve 40, and when air under pressure is introduced into this cylinder, the throttle valve will close.

Let us now assume that the apparatus shown in Figure 12 is connected with the driver and pilot wheels in such a way that shafts 122 and 123 will rotate at the same speed when the driver wheels do not skid or slip on the rails. In which case the shaft 130 will not rotate.

Let us now assume that, due to the application of too much power to the drivers, they slip and tend to spin on the rails. The speed of shaft 122 will increase in direct proportion to the increase in the peripheral speed of the drivers. When this occurs, shaft 130 will begin to rotate to the right or in the direction of arrow "S," thereby operating the gear pump so as to force fluid towards the right and increase the pressure on the diaphragm of valve 143 which opens the valve and permits compressed air to flow through pipe 147, through four-way valve 148, to cylinder 152, thereby closing the throttle valve.

Let us now assume that the train is being stopped or is going down a steep grade and that the brakes are applied with such force as to cause the drive wheels to skid to some extent. When this occurs, shaft 122 will rotate slower than shaft 123, causing shaft 130 to rotate to the left or in the direction of arrow "SK," and causing the gear pump to force liquid towards the left and increase the pressure in the diaphragm of valve 144, causing it to open and permit compressed air from reservoir 145 to flow through pipe 149 into and through the four-way valve and thence through pipe 151 into the train line until the pressure on the brakes is sufficiently relieved by the "Automatic air brake system," and the further skidding of the wheels cease.

If the power transmission between the drive wheels and shaft 122 and between the pilot wheels and the shaft 123 is of such a nature that these shafts will reverse when the direction of travel of the locomotive is reversed, it is necessary to shift the four-way valve when the reversing mechanism is operated and for this purpose this valve is provided with an arm 155 which is connected with the reversing gear of the locomotive in such a way that when the latter is set for forward travel, the four-way valve occupies the position shown by full lines in Figure 12 and when the reversing gear is shifted to reverse the direction of travel, automatically it shifts the four-way valve into the position shown in Figure 13.

Figures 18, 19:
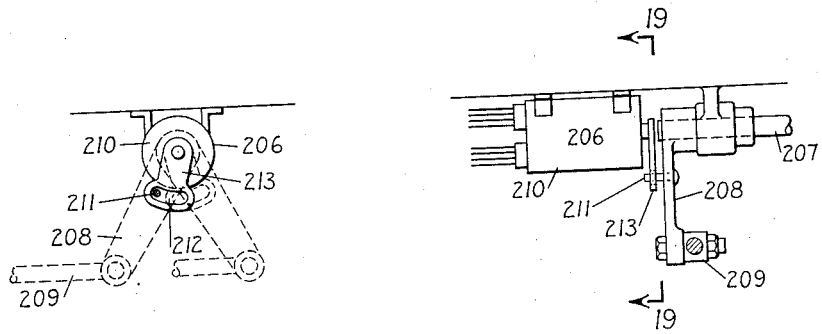
Figure 18 is an end view showing a reversing switch connected with a portion of the reversing gear of the locomotive.
Figure 19 is a view looking in the direction of arrows 19 in Figure 18.

Referring now generally to Figures 17, 18 and 19, as well as to Figure 12, it will be seen that when an electric drive of the type indicated is employed, the four-way valve may be replaced by an electric switch, which also may be operated automatically by the reversing gear of the locomotive; in which case the direction of rotation of shafts 122 and 123 remain unchanged regardless of the direction of travel of the locomotive.

It is obvious that an electric switch may in a like manner be employed to make the whole mechanism inoperative when the locomotive runs backward.

In Figure 14, a modified form of combined hydraulic and electric operating mechanism has been shown. In this embodiment, reference numeral 156 designates a reservoir which contains a suitable fluid or liquid such as a light oil. Connected with the reservoir by means of suitable pipes are pumps 157 and 158. These pumps are driven respectively from the drive wheel axle and the pilot wheel axle and circulate the liquid and exert a pressure upon the liquid in accordance with the speed of rotation of these axles. Pipes 159 connect the delivery ports of these pumps with the fitting 160 from which pipes 161 extend downwardly into the reservoir. Valves 162 of restricted openings are interposed in pipes 161. Extending upwardly from each pipe is a pipe 163. Pipe 163, which corresponds to the pump 157, communicates with the interior of an extensible chamber 164 and the corresponding pipe 163 from pump 158 connects with the interior of the extensible chamber 165. The extensible chambers may be made like bellows or may be comprised of cylinders, pistons, and resistance springs. The inwardly extending ends of the chambers 164 and 165 are provided with projections 166 that engage on opposite sides of a pointer 50b which is pivoted at 167 and is held in a predetermined neutral position by springs 168. Positioned on opposite sides of the pointer are electrical contacts 49b. A battery 38a is positioned in two circuits comprising wires 169, 56, and 57. These circuits include two electromagnets 39 and 51 which control respectively the valve 40 and an air valve 52. Wires 56 and 57 are connected with the contacts 49b, and pointer 50b is connected to the battery by conductor 53.

Let us now assume that the apparatus shown in Figure 14 and described above is applied to and in operation on a locomotive and that pumps 157 and 158 are driven at the same speed from the drive and the pilot wheels respectively. While the speed remains the same, the pointer 50b will occupy the position shown because the forces acting on it are balanced. In case the drive wheels slip, its pump will increase its speed and will also increase the pressure of the liquid in pipe 163, whereupon pointer 50b will move towards the left and close the circuit to the electromagnet 39, thereupon closing the throttle valve, thus cutting off the power that caused the slipping. If, on the other hand, the drive wheels skid, thereby reducing the speed at which pump 157 rotates, pointer 56 will move towards the right and close the circuit to the electromagnet 51, which opens the air valve 52 and relieves the brake pressure responsible for the skidding.

Figure 15:
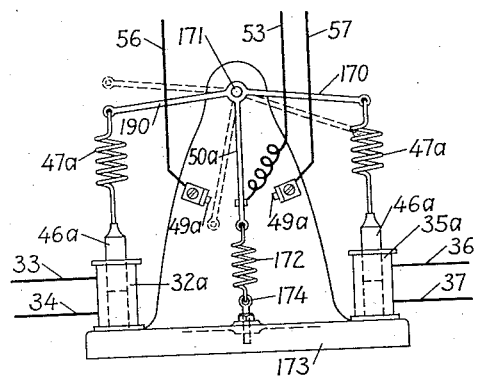
Figure 15 illustrates another operating mechanism in which the differential action is obtained by electromagnetic means whose force varies with the peripheral speeds of the engine wheels.

In Figure 15, another embodiment of the differential speed responsive switch mechanism has been shown. In this embodiment, conductors 33 and 34 which are energized from the generator 28 operated by the pilot wheels are connected in series with a solenoid 32a and conductors 36 and 37 which are energized by the generator 30 driven from the drive wheel axle, are connected in series with solenoid 35a. Each of these solenoids has a core 46a; these cores are suspended by springs 47a from opposite ends of beam 170 which will be referred to as a scale beam that pivots at 171. Attached to the scale beam and extending downwardly therefrom, is a pointer 50a to the lower end of which a spring 172 is attached. This spring is anchored to base 173 at point 174. Wire 53 is connected with the pointer and wires 56 and 57 are connected with the insulated contacts 49a.

Let us now assume that generators 38 and 30 are connected respectively with solenoids 32a and 35a and that the drive wheels slip due to the application of excessive power, thereby rotating at a greater peripheral velocity than the pilot wheels. When this occurs solenoid 35a is energized more than solenoid 32a and overcomes the force exerted by the latter, whereupon scale beam will be tilted about its pivot, moving the contact on pointer 50a into engagement with the contact 49a located to the left in Figure 15, thus completing the electrical circuit which energizes the electromagnetic device 39 or the relay 39a and closes the throttle valve in the manner explained in connection with the other embodiments, or in any other suitable manner. On the other hand, if the drive wheels skid, due to the application of an excessive braking force, the voltage applied to solenoid 35a will decrease, thereby permitting the solenoid 32a to pull the core 46a downwardly moving pointer 50a into engagement with contact 49a to the right; thus the electromagnetic device 51 or the corresponding relay 51a becomes energized, which operates a valve for admitting air into the train line for reducing the braking action.

Figure 16:
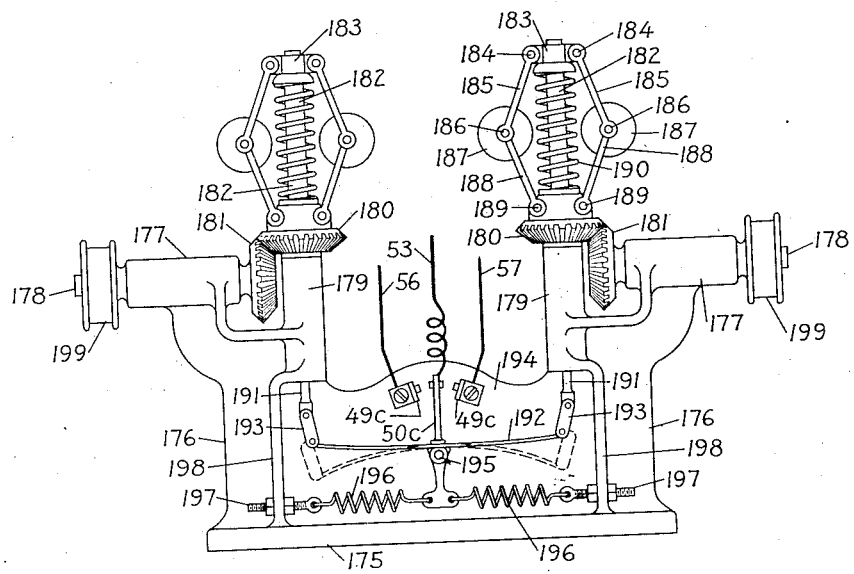
Figure 16 shows a modified form of the differential mechanism in which centrifugal means is employed.

Referring now to Figure 16, which shows another differential registering mechanism, which instrument is operated by the action of centrifugal force; reference numeral 175 denotes its base having two vertically extending brackets 176. The upper ends of the brackets are provided with bearings 177 for the drive shafts 178 and with vertical tubular members 179 on the upper ends of which bevel gears 180 are rotatably positioned. A bevel gear 181 is connected with the inner end of each shaft 178, each gear meshing with one of the bevel gears 180. Rods 182 are slidably mounted in openings in tubular members 179 and have secured to their upper ends brackets 183 that are provided with two pivots 184 for the upper ends of links 185 that are pivotally connected at 186 to the balls 187. Other links 188 extend from the pivots 186 to the pivot 189 on the bevel gears 180. Springs 190 are positioned between the upper end of gears 180 and brackets 183 and are under compression so as to resist outward movement of the balls. When the shafts 178 are rotated, the balls 187 will also rotate in any ordinary governor of this type and move rods 182 downwardly. The lower ends of rods 182 have downwardly projecting resilient extensions 191 that are connected to opposite ends of a flexible beam or spring 192 by means of links 193. Attached to the wall 194 are two contacts 49c to which wires 56 and 57 are attached. A pointer 50c is pivoted at 195 and has a portion extending downwardly from the pivot. Springs 195 have one of their ends attached to the lower end of the pointer 50c and their other ends to eye-bolts 197 that are adjustably connected with the flanges 198 of brackets 176. The upper end of pointer 50c has a contact to which the wire 53 is attached.

Nonrotatably secured to the shafts 178 are belt pulleys 199, one of which is driven by means of a belt and pulley on the axle of the pilot wheel, and the other in the same manner by the drive wheel axle. The transmission mechanism from the axles to the pulleys 199 are so proportioned that shafts 178 will normally rotate at equal speeds. Whenever the centrifugal governors operate, rods 191 are forced downwardly, flexing the spring 192 from the position shown to the position indicated by dotted lines. When the peripheral speeds of the drive and the pilot wheels are equal, the force exerted on the ends of the spring 192 are equal and the latter will flex without moving the pointer in either direction. If the speed of the drive wheel axle increases or decreases due to slipping or to skidding of the drive wheels, the corresponding governor head functions due to the change in the speed of rotation, moving its end of the flexible beam or spring 192 into a higher or lower position than the other end accordingly; thereby moving the contact on pointer 50c into engagement with one or the other of the contacts 49c, whereupon either the power to the drivers will be turned off or the brakes released, depending upon whether the drive wheels are slipping or skidding. Since the manner in which the contacts or the switch serve the electrical devices has been fully explained in connection with other views, it is believed that no further explanation is required.

Attention is called to the fact that the centrifugal governor heads are accurate indicators of speed and also are capable of exerting considerable force, wherefore they may serve adequately as speed responsive devices that may be interconnected in opposition in the manner shown, whereby the attached switch can be made to function in response to differential speed variation.

In Figure 17 an electric wiring diagram has been shown in which reference character "G" designates a three-phase delta wound generator and "M," a synchronous motor of the same construction as the generator. The field or rotor of the generator has been shown as a permanent magnet 200 of a straight bar form which is rotated by means of either the drive wheel axle or the pilot wheel axle. The stator comprises a laminated ring core 201 on which is wound an endless wire coil 202. At points 120 degrees apart, conductors 203, 204, and 205 are connected. These conductors connect corresponding points on both stator windings. A reversing switch 206 is connected in conductors 204 and 205 and serves to connect these wires as shown and to change the connection so that conductor 204 from the generator connects with conductor 205 that extends to the motor, and conductor 205 from the generator connects to motor conductor 204. When the reversing switch occupies the position shown in Figure 17 the rotors of the generator and of the motor will both rotate at equal speeds in the same direction and when the reversing switch is shifted to connect wires 204 and 205 the generator and the motor rotors will rotate at equal speeds, but in opposite directions.

Referring now to Figures 18 and 19, when the direction of travel of the locomotive is to be reversed the operator shifts a lever which rotates shaft 207 in order to move the crank arm 208 on the other end of which a reach rod 209 is pivoted. Reach rod 209 serves to shift the reversing mechanism of a locomotive in the usual way. A housing 210 which contains the reversing switch 206 indicated in Figure 17, which is of the drum type and is positioned adjacent to the crank 208, that has a pin 211 which projects into slot 212 of crank arm 213, which is attached to switch operating shaft 214, which is positioned in axial alignment with the shaft 207. The slot 212 provides sufficient play for adjusting the locomotive reversing mechanism after its initial movement according to the usual practice, without disturbing the setting of the reversing switch, which operates only when the locomotive crank arm 208 of the reversing gear control approaches either of its two extreme positions.

By substituting an ordinary electrical switch of similar construction for the reversing switch 206 and operating it in the same manner, the electrical transmission device, and consequently the entire apparatus or anti-skid device can be left inoperative while the engine is running rearwardly.

It should be observed that besides shutting off the steam completely and consequently the power, the throttle operating mechanism described, is provided with adjustable means whereby the power can be reduced without its being completely shut off.

The timing of the limit switch or the setting of its actuating lever 107 is one such means, but as it is preferable to have this means set for complete closure of the valve, additional means, comprising the magnetically operated clutch, shown in Figure 10, with its two-fold means of limiting the torque transmitted from the motor 68, to the shaft 88, of the throttle mechanism, are provided.

For regulating or limiting the torque the adjustable stop-screw 83 is one means, but this is supplementary to the means indicated in Figure 9, which is the rheostat 215, which provides the adjusting resistance in the electrical circuit operating the clutch magnet 67; which in turn regulates the amount of torque which the friction clutch is to transmit; thus allowing the clutch to slip when the torque is increased beyond the amount required to insure the closing of the throttle valve; as is the case when the operator chooses to prevent it, by applying the required additional resistance to the throttle operating lever 89.

In the above description it has been pointed out that the invention has been explained with particular reference to a locomotive, for the sake of simplicity and convenience. It is to be understood that the invention is equally applicable to any power driven car having wheels rotatable at all times by the friction between them and the rails, and others operatively associated with brakes. When the automatic brake control is considered it is evident that the invention can be applied to a whole train or to each separate car or unit so long as some means is provided for indicating the relative speed of the car or unit with respect to the rails.

The wheels that are used to indicate the speed of the train along the track must be able to rotate at all times in response to rail friction and if they are acted upon by brakes the latter must be so adjusted that the braking effect will be less than on the other wheels. A single master means for indicating the speed of the train along the track is sufficient for any number of cars or trucks as is clearly evident from Fig. 8. Each drive wheel or brake actuated wheel assembly must, however, have a separate speed responsive device corresponding to that indicated by numeral 50 in Fig. 8.

Having described the invention what is claimed as new is:

1. In a railway locomotive, having drivewheels and rotatable pilot wheels rolling on supporting rails, a motor connected with the drivewheels for rotating them, and a brake mechanism operatively connected with the drivewheels for resisting their rotation, means for reducing the tendency of the drivewheels to slip on the rails during the application of power and during braking, said means comprising, a speed responsive device connected with the drivewheels and another connected with the pilot wheels, said devices being responsive to the peripherial speeds of the wheels, means operated by the speed responsive devices on an increase in the peripherial speed of the drivewheels relative to the peripherial speed of the pilot wheels, for reducing the amount of power delivered to the drivewheels, and means operated by the speed responsive devices on a decrease in the peripherial speed of the drivewheels relative to the peripherial speed of the pilot wheels, due to an excessive braking action, to reduce the braking action.

2. In a railway equipment vehicle having at least two wheels resting on a rail, one of said wheels being freely rotatable to the extent that its peripheral speed is at all times the same as the speed of the vehicle relative to the rail, a power means connected with said other wheel for exerting a force thereon tending to increase its peripheral speed to a value greater than the speed of the vehicle relative to the rail, a brake mechanism operatively connected with said other wheel, a speed indicator mechanism connected with each wheel, means controlled by the cooperative action of the two speed indicators for reducing the power when the said second wheel attains a peripheral speed greater than the speed of the train relative to the rail, and means also controlled by the relative cooperative action of the two speed indicators for reducing the braking action when the rate at which the peripheral speed of said second wheel is reduced to a predetermined value below the speed of the vehicle relative to the rail.

3. A speed control device comprising two substantially parallel shafts each having a wheel attached thereto, a motor connected with one of the shafts for rotating it, means comprising a member frictionally engaging both wheels for normally rotating them at the same peripheral speed, a brake mechanism operatively associated with the motor driven wheel, a speed responsive device connected with each of the wheels for indicating its peripheral speed, means for reducing the amount of power, means for reducing the amount of braking action, means comprising the two speed responsive devices for operating the power reducing means when the peripheral speed of the power driven wheel exceeds the peripheral speed of the other wheel, and means responsive to the cooperative action of the speed responsive devices for operating the brake reducing means when the rate at which the peripheral speed of the power driven wheel is reduced a predetermined amount below that of the other wheel.

ALBERT F. ANDERSON.